(12) United States Patent
Yin et al.

(10) Patent No.: US 11,741,053 B2
(45) Date of Patent: Aug. 29, 2023

(54) DATA MANAGEMENT SYSTEM, METHOD, TERMINAL AND MEDIUM BASED ON HYBRID STORAGE

(71) Applicant: SHANGHAITECH UNIVERSITY, Shanghai (CN)

(72) Inventors: Shu Yin, Shanghai (CN); Tongliang Deng, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 54 days.

(21) Appl. No.: 17/144,094

(22) Filed: Jan. 7, 2021

(65) Prior Publication Data

US 2021/0133157 A1    May 6, 2021

Related U.S. Application Data

(63) Continuation-in-part of application No. PCT/CN2019/102033, filed on Aug. 22, 2019.

(30) Foreign Application Priority Data

Nov. 20, 2018 (CN) .......................... 201811383927.2

(51) Int. Cl.
  *G06F 16/18* (2019.01)
  *G06F 16/14* (2019.01)
  *G06F 16/178* (2019.01)
  *G06F 16/185* (2019.01)

(52) U.S. Cl.
  CPC ........ *G06F 16/1847* (2019.01); *G06F 16/148* (2019.01); *G06F 16/178* (2019.01); *G06F 16/185* (2019.01)

(58) Field of Classification Search
  CPC .......... G06F 16/178–1794; G06F 16/148–152; G06F 16/1847; G06F 16/185
  See application file for complete search history.

(56) References Cited

U.S. PATENT DOCUMENTS 9,645,996 B1 *  5/2017  Ledet .................... G06F 40/117
10,719,779 B1 *  7/2020  Sagduyu ................ G06Q 50/01
(Continued)

FOREIGN PATENT DOCUMENTS

CN          106777342 A     5/2017
CN          108021408 A     5/2018
(Continued)

*Primary Examiner* — Tamara T Kyle
*Assistant Examiner* — Michal Bogacki
(74) *Attorney, Agent, or Firm* — Global IP Services; Tianhua Gu

(57) ABSTRACT

This application provides a data management system, method, terminal, and medium based on hybrid storage. The data management system includes: a first file system mount module, to mount at least one user-mode file system; a second file system mount module, to mount at least two independent back-end file systems based on the user-mode file system for storing hot data and cold data respectively; a data label module, to label the hot or cold attribute of the data in a user data request; a file system selection module, to store the data in the corresponding back-end file system and/or take the data out from the corresponding back-end file system according to the hot or cold attribute of the data.

5 Claims, 6 Drawing Sheets

(56) References Cited

U.S. PATENT DOCUMENTS

| | | | | |
|---|---|---|---|---|
| 2007/0058943 A1* | 3/2007 | Blanchard | ............ | G11B 27/034 |
| | | | | 386/326 |
| 2009/0083338 A1* | 3/2009 | Evans | ................... | G06F 16/168 |
| 2011/0055881 A1* | 3/2011 | Yu | ...................... | H04N 21/6587 |
| | | | | 725/88 |
| 2014/0169536 A1* | 6/2014 | Pegg | ................. | H04M 3/42221 |
| | | | | 379/87 |
| 2016/0105385 A1* | 4/2016 | Allen | ................... | H04L 51/214 |
| | | | | 709/206 |
| 2019/0121873 A1* | 4/2019 | Woodworth | ............ | G06F 40/30 |
| 2021/0157858 A1* | 5/2021 | Stevens | ............. | G06F 16/90335 |

FOREIGN PATENT DOCUMENTS

| | | | |
|---|---|---|---|
| CN | 108829341 A | 11/2018 | |
| CN | 109491618 A | 3/2019 | |

* cited by examiner

DATA MANAGEMENT SYSTEM, METHOD, TERMINAL AND MEDIUM BASED ON HYBRID STORAGE

CROSS References to Related Application

This is a continuation-in-part application of PCT International Application No. PCT/CN2019/102033, filed on Aug. 22, 2019, which claims benefit of priority to Chinese Patent Application No. CN201811383927.2, filed with CNIPA on Nov. 20, 2018. The contents of above applications are hereby incorporated herein by reference in their entirety for all purposes.

TECHNICAL FIELD

This application relates to the field of data processing technology, in particular to data management systems, methods, terminals and media based on hybrid storage.

BACKGROUND

With the deepening of domestic informatization and the development of mobile Internet, the data generated by individuals and enterprises is increased. This has also given birth to many public or private cloud storage centers, such as private clouds within enterprise networks, Apple iCould data center settled in Guizhou, etc. But more and more signs indicate that more than 27% of the energy consumed by the data center is used by storage devices. As the storage capacity of data centers rises sharply, the energy consumed by storage devices is also increasing. In order to reduce the energy consumption of storage devices and achieve the dual advantages of economy and environment, it is necessary to optimize the data management system.

The traditional file storage system mainly relies on adjusting the rotation speed of the hard disk drive (HDD) or suspending the unused HDD to save energy. However, frequently starting and stopping the HDD or changing its rotation speed will seriously affect its life, and it is also detrimental to the reliability of the data.

With the emergence of solid-state drives (SSD), storage systems have incorporated SSDs. SSDs have high random read/write performance and low power consumption, thus resulting in a new design concept for the storage systems. The file storage system began to divide the storage medium hierarchically, storing hot data on SSDs, and storing infrequently used data (i.e. cold data) on HDDs, which not only meets the requirements for fast read and write of hot data, but also saves energy in a certain degree, this is the so-called hybrid storage system. However, the introduction of different storage medium places higher requirements on the management of the file system, and also brings challenges to data distribution and data consistency.

However, the traditional hybrid storage system has a significant impact on the life to of the disk. Frequent starting and stopping of the HDD will cause the disk instability, reduce the disk life, and cause data loss in severe cases.

SUMMARY

This application provides a data management system, method, terminal and medium based on hybrid storage to solve the problems of unstable disk status and short disk life in the prior art.

A first aspect of the present application provides a data management system based on hybrid storage, including: a first file system mounting module for mounting at least one user-mode file system; a second file system mounting module for mounting at least two independent back-end file systems based on the user-mode file system, the two independent back-end file systems are configured for storing hot data and cold data, respectively; a data label module for marking user data requests with the hot or cold attribute of the data; and a file system selection module for storing the data in the corresponding back-end file system or retrieve the data from the corresponding back-end file system according to the hot or cold attribute.

The method for the data label module to mark the user data request includes: defining the hot or cold attribute of the data in the data write request according to user configuration information and/or data characteristics; and defining the hot or cold attribute of the data in the read data request according to user configuration information and/or system records.

The data label module is used to uniformly mark the data to be written as hot data or cold data; the file system selection module is used to migrate written data that does not meet the access frequency condition from the current back-end file system to the other back-end file system.

The data label module is used to uniformly mark all the data to be written as hot data; the file system selection module is used to store the hot data in the hot data back-end file system, and record the access frequency of the data in the hot data back-end file system; the data label module is also used to mark the data whose access frequency falls within the first preset threshold range as cold data; the file system selection module is used to migrate the cold data to the cold data back-end file system.

The method for migrating data by the file system selection module includes: cutting data whose access frequency falls within the first preset threshold range from the hot data back-end file system to cold data back-end file system; or, copying the data whose access frequency falls within the first preset threshold range from the hot-data back-end file system to the cold data back-end file system.

The data label module is used to label all the data to be written as cold data; the file system selection module is used to store the cold data marked by the data label module in the cold data back-end file system, and record the access frequency of the data in the hot data back-end file system; the data label module is also used to mark the data whose access frequency falls within the second preset threshold range as hot data; the file system selection module is used to migrate the hot data labeled by the data label module to the hot data back-end file system.

The method for migrating data by the file system selection module includes: cutting data whose access frequency falls within a second preset threshold range from the hot data back-end file system to the hot data back-end file system; or, copying the data whose access frequency falls within the second preset threshold range from the hot data back-end file system to the hot data back-end file system.

The back-end file system includes the hot data back-end file system and the cold data back-end file system. The hot data back-end file system and the cold data back-end file system are PVFS. The storage medium of the node managed by the hot data back-end file system includes a solid state disk; the storage medium of the node managed by the cold data back-end file system includes a hard disk.

A second aspect of the present application provides a data management method based on hybrid storage, including: mounting at least one user-mode file system; mounting at least two independent back-end file systems based on the user-mode file system for storing hot data and cold data respectively marking a user data request to define the attribute of the data in the user data request, and storing the data into or taking the data out of the corresponding back-end file system according to the attribute of the data.

A third aspect of the present application provides a computer readable storage medium, containing a set of instructions which, when executed by a processor, cause the processor to perform the above data management method.

A fourth aspect of the present application provides an electronic terminal, including: a processor and a memory; the memory is used to store a computer program, and the processor is used to execute the computer program stored in the memory, so that the terminal executes the data management method.

A fifth aspect of the present application provides a storage management system for optimizing reading and writing locally in internal of data, including: a data container for dividing a bag file into multiple single topic files; data organizer for organizing the data content when the original bag file is written, and distributing the organized data content to the back-end directory; tag manager for maintaining a hash table for mapping topic types and physical paths; coarse-grained time index for generating index entries and adding the index entries into the index file.

The internal structure of the data container includes a hierarchical directory tree structure; the data container includes a front end and a back end. The front end includes a logical view for viewing bag files in a complete form. The back end is used to store the divided bag file in the hierarchical directory tree structure.

The data organizer scans each piece of information, determines the type of scanned information according to the storage format of the robot operating system, and writes the scanned information into the corresponding backend file.

The operation of the storage management system includes data copying. The data copying includes: after capturing a user's request to write a bag file into the file system, scanning the requested bag file by the data container and dividing the bag file into multiple single-topic files; inserts the divided single-topic file data into the corresponding IO queue by the data organizer, and sending it to the thread pool for IO parallel operation; allocating available threads to write each IO queue to the back-end file system by the thread pool.

The operation of the storage management system includes data acquisition, The data acquisition process includes: after capturing a user's request to the file system to query the topic name, retrieving, by the tag manager module according to the topic name; and returning the corresponding physical path; returning, by the back-end file system, the corresponding topic data to the robot operating system.

The operation of the storage management system includes time index of data. The time retrieving of data includes: setting a fixed time window for the bag file, subdividing, by the data organizer, the topic file according to the time window for time retrieving of data according to the start time and end time in the user request.

As mentioned above, the data management system, method, terminal and medium based on hybrid storage of the present application have the following beneficial effects:

1) Significant energy-saving effects are achieved. By operating the nodes where the underlying distributed file system is located, such as standby or temporary shutdown, the energy consumption of the data center can be significantly reduced. The average power of a storage node is about 400 W. By standby or temporary shutdown, the power of a node can be reduced to 50 W (standby) or 0W (shutdown).

2) Ensuring the reliability of the storage system. By mounting different underlying distributed file systems, since each distributed system is independent of each other, the reliability of the entire storage system will not be affected by the migration of data or the damage of a certain part of the data.

3) Data consistency is ensured. This application will only classify data, organize data, and redistribute data. These functions are implemented in the form of middleware, and users can choose not to use this function. The processes of data storage and disk to storage media are handed to the mounted underlying distributed file system for processing. Therefore, this application will not damage the consistency of the data.

DETAILED DESCRIPTION OF THE PREFERRED EMBODIMENTS

Figure 1:
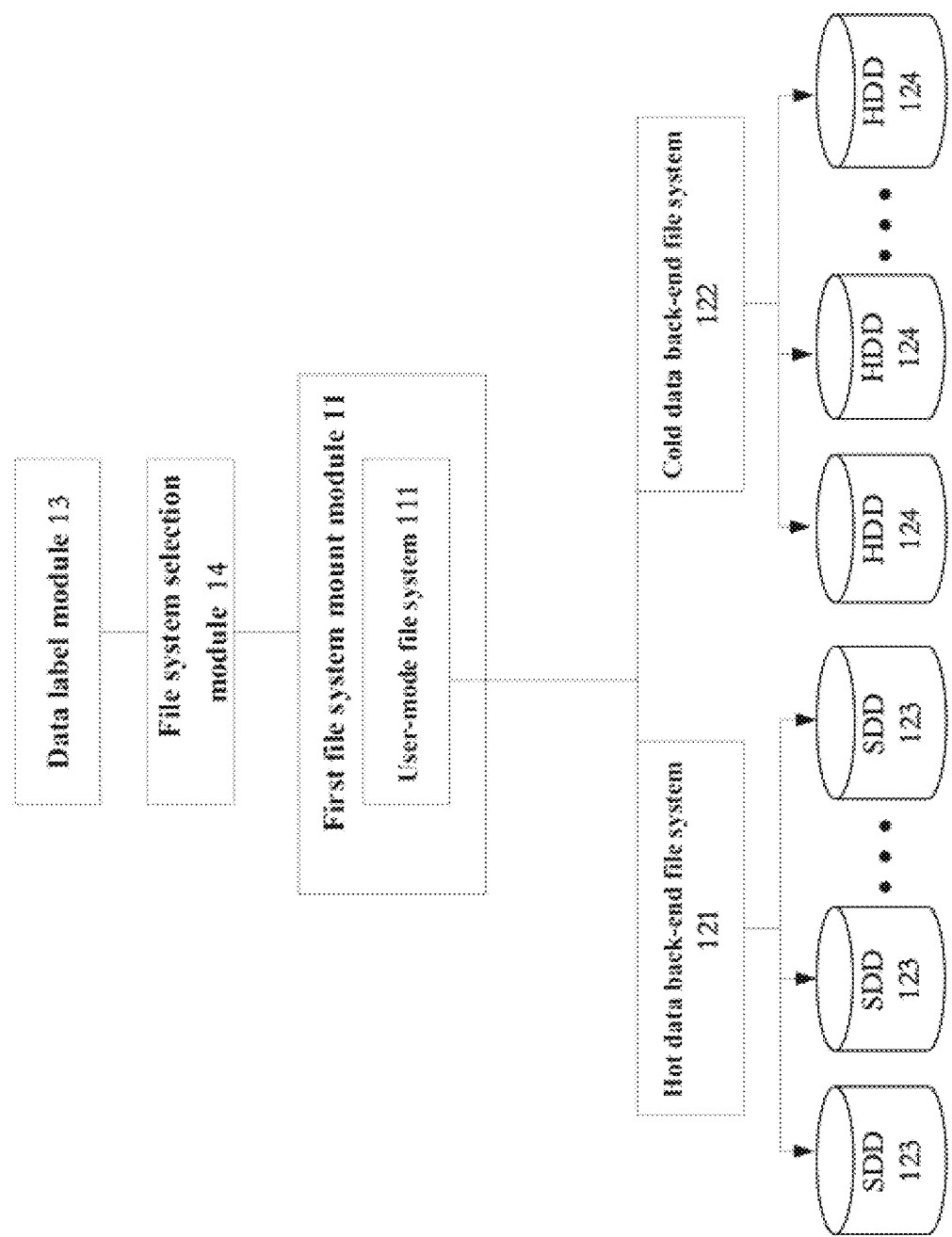
FIG. 1 shows a schematic diagram of a data management system based on hybrid storage in an embodiment of this application.

The following specific examples illustrate the implementation of this application. Those skilled in the art can easily understand the other advantages and effects of this application from the content disclosed in this specification. This application can also be implemented or applied through other different specific embodiments, and various details in this specification can also be modified or changed based on different viewpoints and applications without departing from the spirit of the application. It should be noted that the following embodiments and the features in the embodiments can be combined with each other if there is no conflict.

It should be noted that in the following description, with reference to the accompanying drawings, the accompanying drawings describe several embodiments of the present application. It should be understood that other embodiments can also be used, and mechanical, structural, electrical, and operational changes can be made without departing from the spirit and scope of the application. The following detailed description should not be considered restrictive, and the scope of the embodiments of the present application is limited only by the claims of the published patent. The terms used here are only for describing specific embodiments, and are not intended to limit the application. Space-related terms, such as "upper", "lower", "left", "right", "under", "below", "lower", "above", "on", etc., can be used in the text for ease of explanation the relationship between one element or feature shown in the FIG. and another element or feature.

In this application, unless expressly stipulated and limited otherwise, the terms "install", "connect", "join", "fix", "hold" and other terms should be understood in a broad sense. For example, a connection may be a fixed connection, a detachable connection, or an integral connection. A connection also may be a mechanical connection or an electrical connection. A connection also may be directly connected or indirectly connected through an intermediate medium, or internal communication between two components. For those of ordinary skill in the art, the specific meanings of the above-mentioned terms in this application can be understood according to specific circumstances.

Furthermore, as used herein, the singular forms "a", "an" and "the" are intended to include the plural forms, unless the context dictates to the contrary. It should be further understood that the terms "comprise" and "include" indicate the presence of the described features, operations, elements, components, items, types, and/or groups, but do not exclude one or more other features, operations, elements, components, the existence, appearance or addition of items, categories, and/or groups. The terms "or" and "and/or" used herein are interpreted as inclusive or mean any one or any combination. Therefore, "A, B or C" or "A, B and/or C" means "any of the following: A; B; C; A and B; A and C; B and C; A, B and C". An exception to this definition will only occur if the combination of elements, functions or operations is inherently mutually exclusive in some way.

Hybrid storage system is a storage system that stores hot data on solid-state hard drives and stores cold data which is not frequently used on hard disk drives (HDD). The hybrid storage system can not only meet the requirements for fast read and write of hot data, but also meet requirements of energy saving to some extent. However, the hybrid storage system used in the prior art will cause disk instability due to frequent start and stop of the HDD, which will reduce the life of the disk, even lose data in severe cases.

This application proposes a data management system based on hybrid storage. The data management system is mounted with a user-mode file system, and a back-end file system for storing hot data and a back-end file system for storing cold data are mounted on the user-mode file system independently. In addition, the data management system includes a data label module for labeling the hot and cold attributes of the data, and a file system selection module for selecting the corresponding back-end file system according to the hot and cold attributes of the data, thereby meeting data consistency requirements while achieving the high performance and low power consumption of the parallel and the distributed storage system.

Embodiment 1

In order to clearly describe the data management system based on hybrid storage of the present application, a detailed description will now be given with reference to FIG. 1. As shown in FIG. 1, the data management system based on hybrid storage includes a first file system mounting module 11, a second file system mounting module 12, a data label module 13 and a file system selection module 14.

The first file system mounting module 11 is used to mount at least one user-mode file system 111. In this embodiment, the first file system mounting module 11 uses the FUSE tool (File system in User space) to mount a user-mode file system in the system for managing users' POSIX I/O requests. The user mode file system is a file system framework implemented in the user space. With the support of the FUSE kernel module, the user can realize a file system by only implementing specific file operations according to the interface provided by FUSE. In the traditional environment, after the user or application program calls the standard POSIX interface, the operating system will switch to the kernel mode and execute related system calls to process these requests, and FUSE can dispatch the request from the kernel mode to the user mode. The advantage of using FUSE is that the newly designed file system can participate in the related operations of the traditional file system only through the user mode without modifying the operating system kernel code, which simplifies the design complexity of the new file system. At the same time, it increases the autonomy of developers and reduces the changes to the kernel, which is very good for maintaining system stability.

The second file system mounting module 12 is configured to mount at least two mutually independent back-end file systems based on the user-mode file system 111 for storing hot data and cold data respectively.

In one embodiment, the second file system mounting module 12 uses the multi-backend function of parallel log-structured file system (PLFS) to support multiple storage back-ends, and mounts multiple back-end parallel file system in the user-mode file system to realize a user-mode hybrid storage system. In this embodiment, PLFS is used to mount two independent back-end parallel file systems in the user-mode file system. One of the back-end storage systems is used to store hot data, and is defined as a hot data back-end file system 121, the other back-end storage system is used to store cold data, and is defined as a cold data back-end file system 122. It should be noted that this application only performs data classification, reorganization and redistribution operations, and selects a back-end storage system for the corresponding data. The actual file management operations are not the focus of this application, which is usually performed by the bottom file system.

The data management system solution based on hybrid storage involved in this application can support existing common parallel file systems such as Lustre, PVFS and Ceph through API interfaces. This application uses Parallel Virtual File System (PVFS) as the back-end parallel file system, that is, the hot data back-end file system and the cold data back-end file system are both PVFS. PVFS is designed for large-scale cluster computing, focusing on high-performance accessing to large data sets, and providing data management similar to RAID-O.

The hot data back-end file system is a high-speed and low-power parallel file system composed of SSD solid state drives 123, that is, the storage medium of the node managed by the hot data back-end file system is a solid state drive. The cold data back-end file system is a traditional high-capacity and low-cost parallel file system composed of the HDD 124, that is, the storage medium of the node managed by the cold data back-end file system is a HDD. Therefore, the parallel file system designed in this way can balance the I/O performance and power consumption of the storage system. In addition, the design considers the difference in the life of the solid-state disk and the disk, and considers the reliability of the storage system. The two systems have no interference with each other. The communication between systems is only through the local area network.

It is worth noting that this application provides an implementation solution for the middle layer that is transparent to users and the underlying system, by using the user-mode file system FUSE, the back-end parallel file system involved in this application is mount on a mature parallel file system, POSIX data requests is managed in user mode. This scheme realizes data management without modifying the application code and kernel code in file system, and has strong compatibility and consistency.

The data label module 13 is used to mark the user data request to define the hot or cold attribute of the data in the user data request. In this embodiment, the present application provides the data label module 13 in the user-level file system for labeling data requests to define the hot or cold attribute of the data. For example, when a data write request enters the system, the data label module 13 defines the hot or cold attribute of the data in the data write request according to user configuration and/or data characteristics, so as to label the data with corresponding cold or hot tags. The file system selection module 14 stores the data in the corresponding back-end file system according to the hot or cold tag of the data. When a read data request enters the system, the data label module 13 defines the cold or hot attribute of the data in the read data request according to user configuration information and/or system records, so as to mark the data with corresponding cold or hot tag. The file system selection module 14 fetches the data from the corresponding back-end file system according to the hot or cold tag of the data, and delivers it to the read data request.

It is worth noting that the data redistribution function of this application is implemented based on Parallel Log-structured File System (PLFS). This function re-arranges the data blocks according to the application process ID (PID) of the call request to ensure that the hot and cold data can be distributed to the corresponding underlying file system, which is conducive to improve the efficiency of data reading, writing and management.

The data label module 13 labels the write data request and read data request according to the user configuration information. That is, the user has the highest priority for the definition of the hot or cold attribute of the data. For the I/O request, the hot or cold attribute is determined according to the user's definition first. If there is no relevant definition information, the hot or cold attribute is determined in the following way: the data label module 13 marks all the data to be written as hot data or cold data; the file system selection module 14 migrates the written data which does not conform the access frequency condition from the current back-end file system to the other back-end file system with opposite attribute. Since the cold data back-end file system and the hot data back-end file system are preferably managed independently by two PVFS parallel file systems, the data migration process can be simplified to the data replication process, which is very simple and efficient, and can be specifically explained as the following two methods.

Method 1: The data label module 13 marks all the data to be written as hot data, and the file system selection module 14 stores the data in the hot data back-end file system, and records the access frequency of these data. The file system selection module 14 marks the data whose access frequency falls within the first preset threshold range as cold data based on the cache elimination algorithm. For example, data with access frequency lower than a preset frequency is defined as data that is rarely accessed, so it can be defined as cold data in this embodiment. It should be noted that the setting of the first preset threshold range can be set by the user, or can be derived from past experience, which is not limited by this application.

The cache elimination algorithm refers to eliminating data that does not meet the requirements by using of a certain mechanism, for example: Least Recently Used (LRU) algorithm, which marks the least recently used data as cold data; or Least Frequently Used (LFU) algorithm, which marks the lowest frequency data as cold data, etc. It should be noted that the technical means to eliminate cold data from hot data is not the focus of this application. Among the technical standards and knowledge generally known to those skilled in the art, any method for eliminating cold data from hot data may be applied in this application.

In an embodiment, the method for the file system selection module 14 to migrate data includes: copying the data whose access frequency falls within the first preset threshold range from the hot data back-end file system to the cold data back-end file system, that is, all data is stored in the cold data back-end file system, and the hot data back-end file system is used as a cache; or, cutting data whose access frequency falls within the first preset threshold range from the hot data back-end file system to the cold data back-end file system, that is, all the data has only one copy in the system.

Method 2: The data label module 13 marks all the data to be written as cold data, and the file system selection module 14 stores the cold data in the cold data back-end file system, and records the access frequency of the data in the hot data back-end file system. The file system selection module 14 marks the data whose access frequency falls within the second preset threshold range as hot data; the file system selection module is used to migrate the hot data to the hot data back-end file system. For example, data with access frequency higher than or equal to a preset frequency is defined as frequently accessed data, so it can be defined as hot data in this embodiment. The second preset threshold range can be set by the user, or can be derived from past experience, which is not limited in this application.

In an embodiment, the method of migrating data by the file system selection module 14 includes: copying data whose access frequency falls within the second preset threshold range from the hot data back-end file system to the cold data back-end file system, all data is stored in the cold data back-end storage system, and the hot data back-end file system is used as a cache; or, cutting, the data whose access frequency falls within the second preset threshold range from the hot data back-end file system to the hot data back-end file system, that is, all the data has only one copy in the system.

Through the above data migration method, the data management system of the present application can effectively save energy. Specifically, when the access frequency of cold data continues to decrease, most user access requests hit the hot data back-end system and standby the cold data node to save energy. When the access request hits the cold data, the cold data node is started from standby and responds to the request. Therefore, this application can significantly reduce the energy consumption of the data center by operating the node where the underlying distributed file system is located, such as standby or temporary shutdown. The average power of a storage node is about 400 W. Through standby or temporary shutdown, the power of this node can be reduced to 50 W (standby) or 0 W (shutdown).

In order to further facilitate those skilled in the art to understand data management system based on hybrid storage in the present application, the following will describe multiple operation processes such as opening files, writing data, reading data, closing files, background operations, and energy-saving management in a specific embodiment so as to explain the workflow and principle of the data management system of this application.

The file opening operation includes steps from step A01 to step A10.

Step A01: Call the open interface to open a file.

Step A02: Forward this call to the user-level file system reloaded by this application through FUSE.

Step A03: Query whether this file is in map<filename, fd>; if it exists, increase the number of use and turn to step A10.
Step A04: Determine the data is hot data or cold data through the data label module.
Step A05: Store the data in the corresponding back-end file system through the file system selection module.
Step A06: Query whether the file exists through the API provided by PVFS.
Step A07: Query file permissions through the API provided by PVFS.
Step A08: Obtain the file descriptor fd.
Step A09: The file descriptor is stored in the memory area of the user-level file system of this application, and saving the mapping between the file name and the file descriptor using map<filename, fd>, and increase the number of use.
Step A10: Return the file descriptor fd.
The data writing operation includes steps B01 to B05.
Step B01: Call the write interface to write data to the file corresponding to a file descriptor.
Step B02: Forward this call to the user-level file system reloaded by this application through FUSE.
Step B03: Record the writing frequency of this file.
Step B04: Write data to the back-end system through the API provided by PVFS.
Step B05: When the write operation is completed, return the number of write bytes.
The operation of reading data includes steps C01 to C05.
Step C01: Call the read interface to read data from a file corresponding to a file descriptor.
Step C02: Forward this call to the user-level file system reloaded by this application through FUSE.
Step C03: Record the reading frequency of this file.
Step C04: Read data from the back-end system through the API provided by PVFS.
Step C05: When the read operation is completed, return the read data.
The file closing operation includes steps D01 to D07.
Step D01: Call the read interface to read data from the file corresponding to a file descriptor.
Step D02: Forward this call to the user-level file system reloaded by this application through FUSE.
Step D03: Query whether the file is in map<filename, fd>, if it exists, turn to step D04, if not, turn to step D07.
Step D04: Subtract the number of use of this fd.
Step D05: If the number of use is zero, turn to step D06, if it is not zero, turn to step D07.
Step D06: Close the file pointed to by the fd through the API provided by PVFS.
Step D07: Return.
The background operation includes steps E01 to E05.
Step E01: According to the access frequency of the file, determine which state (cold or hot) the file is in at this time.
Step E02: If the data changes from cold to hot, call the copy command to copy the data from the cold data back-end system to the hot data back-end system. According to the configuration information, delete the data in the cold data back-end system, or not.
Step E03: If the data changes from hot to cold, call the copy command to copy the data from the hot data back-end system to the cold data back-end system, and delete the data in the hot data back-end system.
Step E04: Because there are two options for cold or hot data storage, the processing for cold or hot data will be different.
Step E05: When data migration is performed according to the above method 1, that is, the initial data is stored in the hot data back-end file system, and as little data as possible is transferred to the cold data back-end file system to increase the hit rate, but it is necessary to ensure that the hot data back-end file system has sufficient capacity to prevent the coldest hot data from being migrated to the cold data back-end system because the capacity reaches the threshold. When performing data migration according to the above method 2, that is, the initial data is stored in the cold data back-end file system, as much data as possible is transferred to the hot data back-end file system to increase the hit rate, but it is necessary to ensure that the hot data back-end file system has sufficient capacity to prevent the data that has just been migrated to the hot data back-end system from being migrating back to the cold data back-end system because the capacity reaches the threshold.

The energy-saving management operation includes steps F01 to F02.
Step F01: When the access frequency of cold data decreases, most user access requests hit the hot data back-end system, and standby the cold data node to save energy.
Step F02: When the access request hits the hot data, start the cold data node from the standby state and respond to the request.

It should be understood that the division of the various modules of the above system is only a division of logical functions, and can be fully or partially integrated into a physical entity in actual implementation, or can be physically separated. And these modules can all be implemented in the form of software called by processing elements; they can also be implemented in the form of hardware. Some modules can be implemented in the form of calling software by processing elements, and some of the modules can be implemented in the form of hardware. For example, the file system selection module can be a separately established processing element, or it can be integrated into a certain chip of the above system for implementation. In addition, it can also be stored in the memory of the above system in the form of program code. The processing element calls and executes the functions of the above file system selection module. The implementation of other modules is similar. In addition, all or part of these modules can be integrated together or implemented independently. The processing element described here may be an integrated circuit with signal processing capability. In the implementation process, each step of the above method or each of the above modules can be completed by hardware integrated logic circuits in the processor element or instructions in the form of software.

For example, the above modules may be one or more integrated circuits configured to implement the above methods, for example: one or more application specific integrated circuits (ASICs), or one or more microprocessors (Digital signal processor, DSP), or, one or more Field Programmable Gate Array (FPGA), etc. For another example, when one of the above modules is implemented in the form of processing element scheduling program code, the processing element may be a general-purpose processor, such as a central processing unit (CPU) or other processors that can call program codes. For another example, these modules can be integrated together and implemented in the form of a system-on-a-chip (SOC).

Embodiment 2

Figure 2:
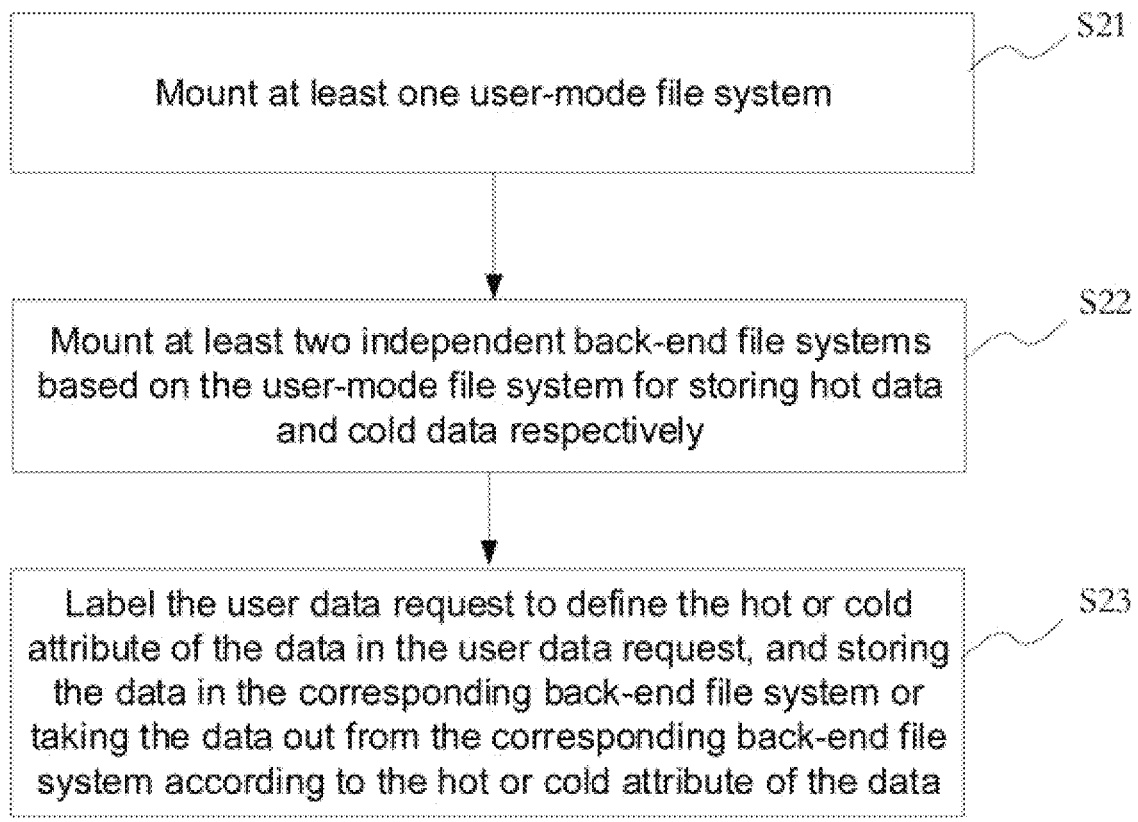
FIG. 2 shows a schematic flow diagram of a data management method based on hybrid storage in an embodiment of this application.

As shown in FIG. 2, a schematic flow chart of a data management method based on hybrid storage in an embodiment of the present application is shown. The data management method specifically includes step S21, step S22, and step S23.

Step S21: Mount at least one user mode file system.

Step S22: Mount at least two mutually independent back-end file systems based on the user-mode file system to store hot data and cold data respectively.

Step S23: Mark the user data request to define the hot or cold attribute of the data in the user data request, and store the data in the corresponding back-end file system or take the data out from the corresponding back-end file system according to the attribute of the data.

It should be noted that the implementation of the data management method based on hybrid storage is similar to the foregoing implementation of the data management system based on hybrid storage, so it will not be repeated.

Embodiment 3

The present application further provides a computer readable and writable storage medium containing a computer program which, when executed by a processor, the computer program causes the processor to perform the above data management method.

If the function is implemented in the form of a software functional unit and sold or used as an independent product, it can be stored in a computer readable storage medium. Based on this understanding, the part that the technical solution of this application essentially contributes to the existing technology is embodied in the form of a software product, and the computer software product including several instructions is stored in a storage medium, causes a computer device (which may be a personal computer, a server, or a network device, etc.) to execute all or part of the steps of the methods described in the embodiments of the present application.

In the embodiments provided in this application, the computer readable and writable storage medium may include a read only memory (ROM), a random access memory (RAM), an electrically erasable programmable ROM (EEPROM), a compact disc ROM (CD-ROM), an optical disk storage device, a magnetic disk storage device, a magnetic storage device, a flash memory, a U-disk, a mobile hard disk, or any other medium that can be used to store desired program code in the form of instructions or data structures and can be accessed by a computer. In addition, any connection is properly termed a computer-readable medium. For example, if the instruction is sent from a website, server or other remote source using coaxial cable, fiber optic cable, twisted pair, digital subscriber line (DSL), or wireless technologies such as infrared, radio, and microwave, the coaxial cable, fiber optic cable, twisted pair, DSL, or wireless technologies such as infrared, radio, and microwave are included in the definition of the medium. However, it should be understood that computer readable and writable storage media and data storage media do not include connections, carrier waves, signals, or other transient media, but are intended for non-transitory, tangible storage media. For example, the magnetic disks and optical disks used in the application include compact disks (CD), laser disks, optical disks, digital versatile disks (DVD), floppy disks and Blu-ray disks. Disks usually copy data magnetically, while optical disks use laser to copy data.

Embodiment 4

Figure 3:
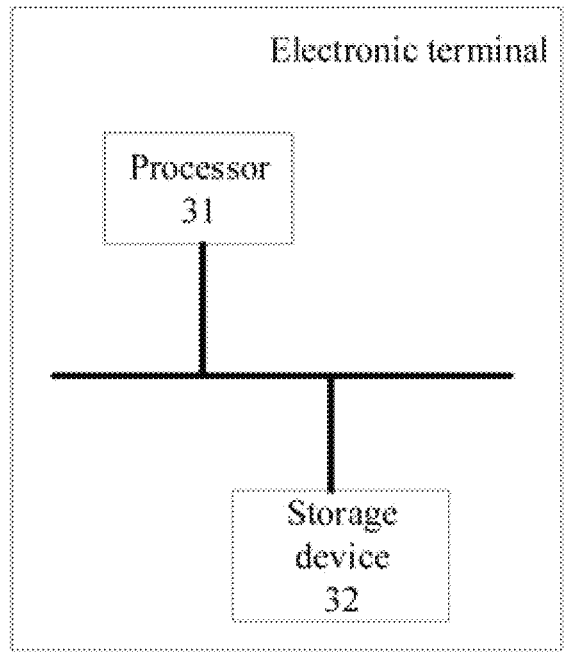
FIG. 3 shows a schematic diagram of an electronic terminal in an embodiment of this application.

As shown in FIG. 3, there is shown a schematic diagram of an electronic terminal provided by an embodiment of the present application. The electronic terminal includes: a processor 31 and a memory 32. The memory 32 is in communication with the processor 31 through a system bus, the memory 32 is used to store computer programs, and the processor 31 is used to execute the computer program, and cause the electronic terminal to perform the above steps of a data management method based on hybrid storage.

The aforementioned system bus may be a Peripheral Component Interconnect (PCI) bus or an Extended Industry Standard Architecture (EISA) bus. The system bus may be divided into address bus, data bus, control bus, etc. For ease of representation, only one thick line is used to indicate the system bus, but it does not mean that there is only one bus or one type of bus. The communication interface is used to realize the communication between the database access device and other devices (such as client, read-write library and read-only library). The memory may include random access memory (RAM), or non-volatile memory, such as at least one disk memory.

The aforementioned processor may be a general-purpose processor, including a central processing unit (CPU), a network processor (NP), etc.; a digital signal processor (DSP), Application Specific Integrated Circuit (ASIC), Field-Programmable Gate Array (FPGA), or other programmable logic device, discrete gate, transistor logic device, or discrete hardware component.

Embodiment 5

This embodiment provides a storage management system for locally optimizing reading and writing of data. The main purposes of the system are as follows: first, the system is compatible with existing Robot Operating System (ROS) application and provides developers with a transparent layer, and upper-layer applications do not need to modify the interface; second, to the system provides a fast and efficient message retrieval program.

It is worth noting that the ROS is an open source underlying framework composed of a set of software libraries for building, writing and running robot programs among multiple computers. Its goal is to promote developers to build various robotic applications, such as simultaneous localization and mapping (SLAM). Besides conventional robot applications, robot control and analysis systems including unmanned aerial vehicles (UAV) and low-power rescue equipment can also be developed on the ROS platform. The abstraction provided by ROS allows developers to design and implement robotic applications without considering the underlying hardware. The robot control system usually includes multiple nodes, for example, one node controls the laser rangefinder, and another node controls the wheel motors. The nodes communicate by passing messages, and the messages are published/subscribed through a logical channel called topic. Nodes usually publish messages to a selected topic. Usually, publishers and subscribers do not know each other, which can decouple information producers and consumers.

ROS provides a tool called rosbag, which can record messages published on one or more topics in a special format file called a bag, and then replay these messages when needed. The message recording and replaying function forms an effective way to test some robot software. The developers only run the robot once when recording some related topics, and then replay messages on these topics multiple times to test the software. As the basic storage abstraction in ROS, bag can well meet its original expectations.

However, more than just replaying the message, many applications also need to extract some topic information (message) from the bag file for subsequent analysis. For example, SLAM needs to extract image data from bag files to construct a point cloud, and further generate maps based on inertial measurement data. In order to achieve this goal, the traditional rosbag tool needs to perform a series of operations, obtain the offset of the message (message) by scanning the entire file, and build a query index in the memory by collecting related data types. In addition, in order to provide two-dimensional data queries such as <topics, time_range>, rosbag must collect the timestamps of all messages, and then build an index to determine the position of the message between the start time and the stop time. Therefore, for the following reasons, the current method for extracting messages from bag files is inefficient: (1) Every time a developer opens a bag file, the ROS framework needs to scan the bag file to collect message location information and statistical information for subsequent indexing. This is very time-consuming; (2) The developer must write a script to replay the bag file for subscribing the interested messages, or for traversing the messages in the bag, which is neither efficient nor reusable; (3) Because the bag was not designed to handle complex queries for data analysis at first, so it is very time-consuming to extract message records having multiple topic, especially when the size of the bag file increases.

With the rapid development of artificial intelligence, the demand for complicated and advanced data analysis for ROS application is increasing. For example, artificial intelligence algorithms such as Convolutional Neural Network (CNN), Recurrent Neural Network (RNN), and Adversarial Generation Network (GAN) need to extract a large amount of data from the bag file for training the model, so as to apply to pattern recognition and strategy selection applications. The traditional bag-based storage model is difficult to meet such complicated data analysis requirements. Similarly, the database is not friendly to ROS data analysis. The main reasons are as follows: (1) the database only supports basic data types. In order to use ROS data types, the format of the data need to be converted; (2) it is very time-consuming to store a large amount of message data into the database.

Based on the above reasons, the embodiment of the present disclosure proposes a storage management system for locally optimizing reading and writing of data. The system is a new file system middle layer (Bag Optimizer for Robotic Analysis BORA) for optimizing the storage format of ROS bag, so as to meet the requirement of big data retrieval and analysis of robot. In addition, the present disclosure proposes a simplified index model based on the original retrieval mechanism of ROS to speed up data query.

Figure 4:
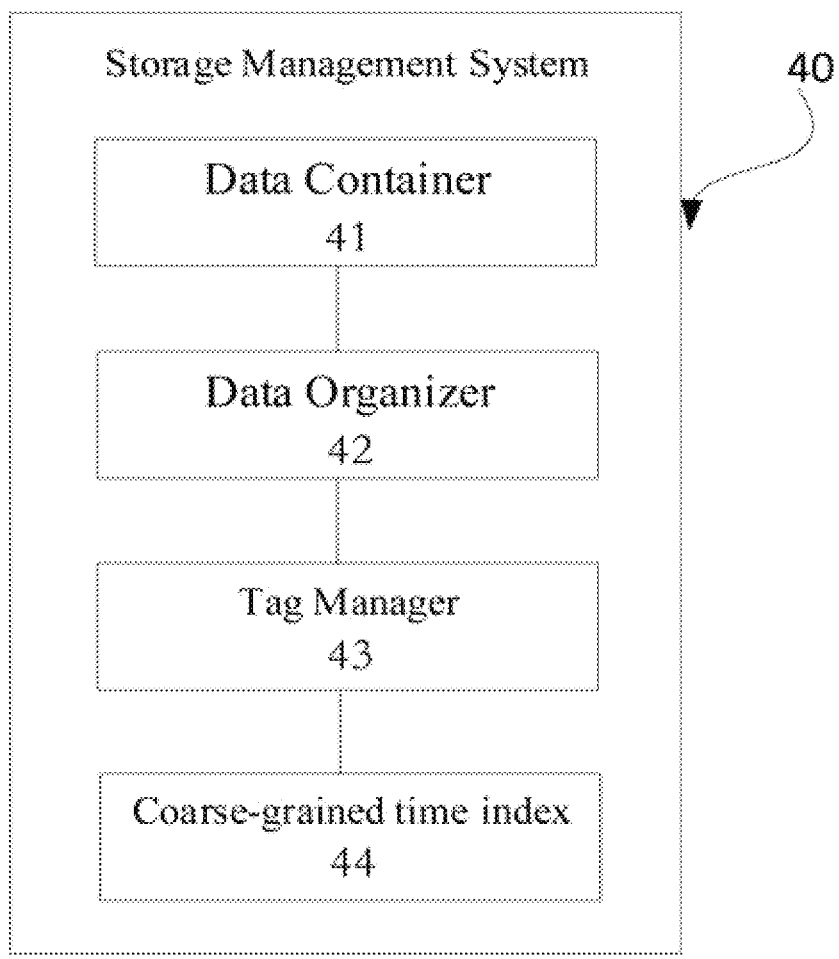
FIG. 4 shows a schematic diagram of a storage management system in an embodiment of this application.

As shown in FIG. 4, the storage management system 40 provided in this embodiment includes a data container 41, a data organizer 42, a tag manager 43, and a coarse-grained time index 44.

The data container 41 is used to automatically divide a bag file into multiple single theme files to improve performance, and each bag file will create a container data structure for management. The internal structure of the data container includes a hierarchical directory tree structure. The data container creates a front-end and a back-end; the front-end includes a logical view for viewing bag files in a complete form; the back-end is used to save the divided bag file with the hierarchical directory tree structure. More specifically, the data container 41 will create a logical view for the user, that is, the front-end. The user can see the bag file that remains in the form of a complete file based on the front-end perspective, and the application can still transparently access the bag file using the POSIX interface. At the same time, the data container 41 creates a back-end for the user, which is used to store the divided data of the bag file with a hierarchical directory tree structure.

Figure 5:
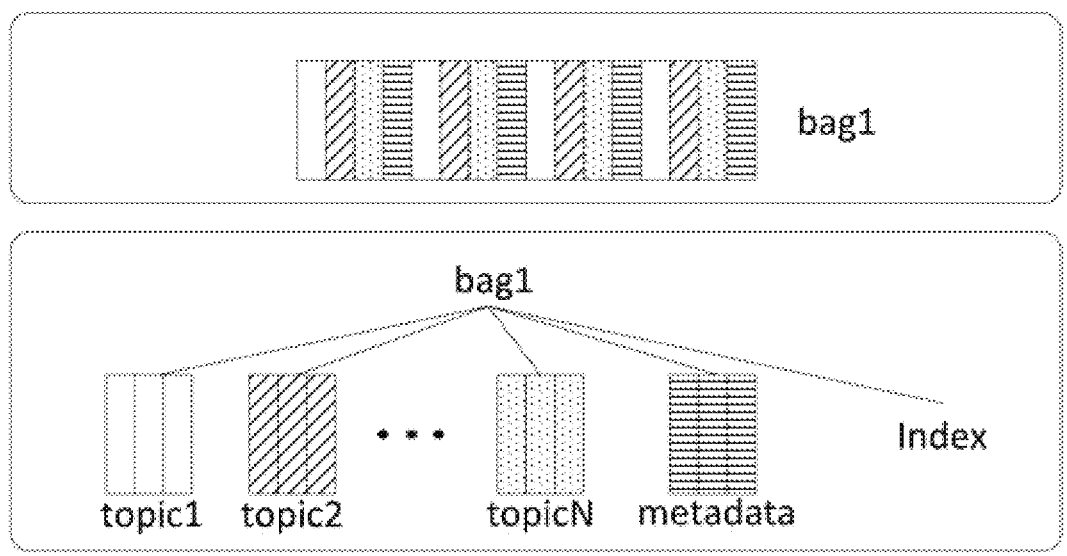
FIG. 5 shows a schematic diagram of the bag file being divided into multiple single topic files in an embodiment of this application.

Referring to FIG. 5, the upper layer is the front-end, the lower layer is the back-end, the front-end is the root directory of the same file name bag1, and the bag1 file in the back-end is divided into multiple single topic files (topic1, topic2, topicN) and metadata files, these separate single topic files are indexed to reorganize the logic of the front-end. Every time data is written, the data container 41 adds message data to the corresponding topic file, and the coarse-grained time index 44 generates an index entry and adds it to the index file. The index entry contains an offset mapping from the logical file offset to the physical file.

The data organizer 42 is used to organize the data content when the original bag file is written, and distribute it to the back-end directory. The data organizer 42 scans each message, and determines the type of the message according to the storage format of the ROS, so as to write it into the corresponding back-end file. Further, in order to make better use of the IO bandwidth, the data organizer 42 uses the producer-consumer model to scan files through a thread and perform IO data operation through a set of thread pools. Specifically, the data organizer 42 creates an IO queue for each topic or metadata file. When the main thread scans the file, the corresponding information is inserted into the corresponding IO queue, and then awakens the thread pool by the way of the signal amount, and then launches IO in parallel. In addition, the size of the thread pool can be dynamically adjusted.

The tag manager 43 is used to maintain a hash table for mapping topic types and physical paths. The keyword of each record in the hash table is the topic name, and the value is the back-end path, so the tag manager 43 can quickly locate the actual data location through the topic name. Every time a file is opened, the tag manager 43 constructs a hash table, which is very efficient and does not affect the overall performance.

In some examples, the operations of the storage management system in this embodiment include conventional POSIX APIs, including but not limited to open operations and read operations. For such operations, the ROS library can run without any modification.

In some examples, the operation of the storage management system in this embodiment includes data analysis, which contains: data replication, data acquisition, and time retrieval of data. The data analysis will be described in detail below.

The data duplication process includes: ROS mainly uses bag as the storage format, and uses bag as the carrier of robot data sharing and the object of analysis; when the bag is copied from an external device or downloaded from a remote location, the storage management system will reorganize the data, and this process is data duplication.

Figure 6:
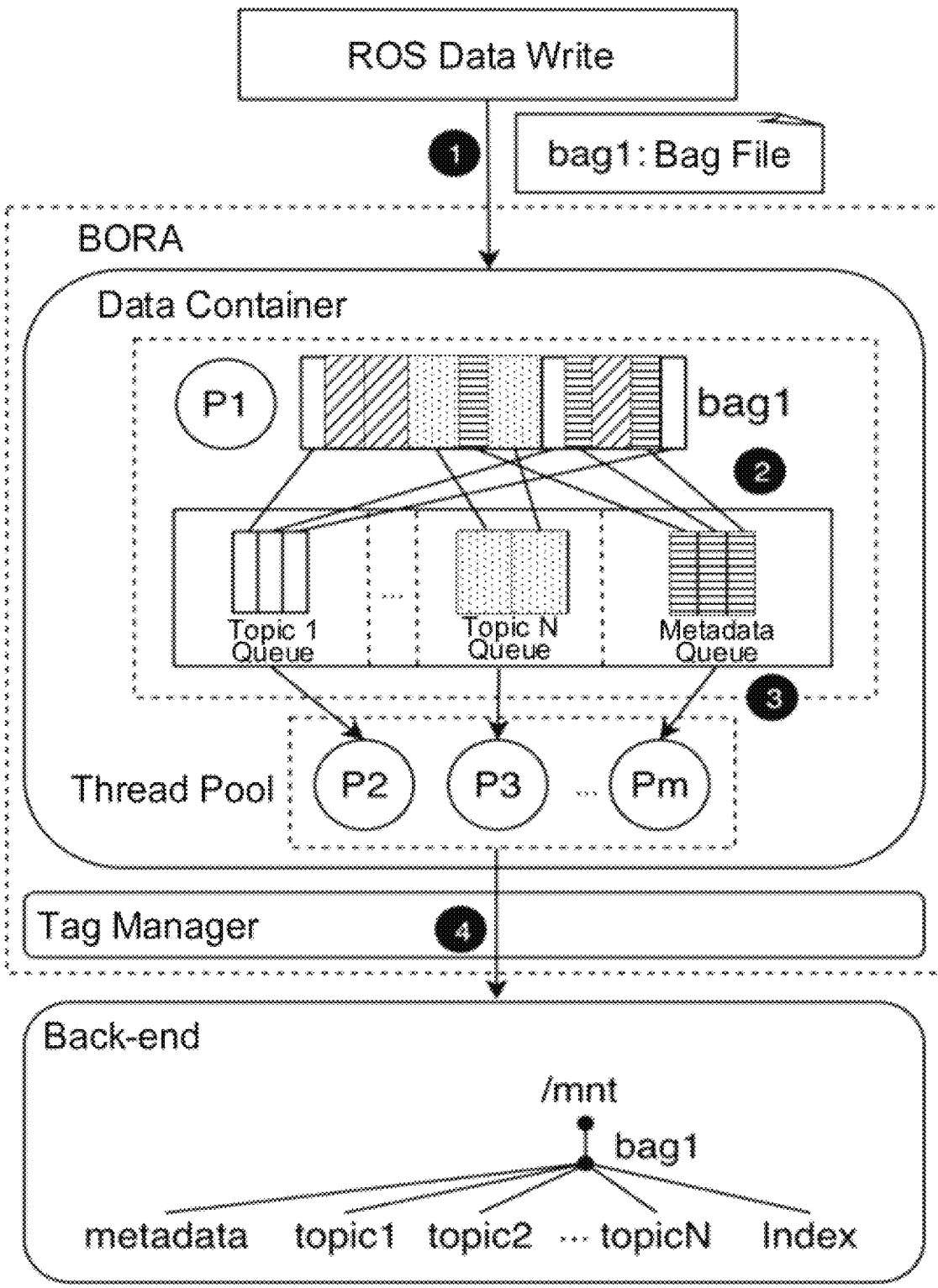
FIG. 6 shows a schematic diagram of the data copying process in an embodiment of this application.

For details, referring to the data copy process in FIG. 6.

1. The storage management system captures the user's request to write the bag to the file system. 2. The data container scans the entire file and divides the data into different topics, since not all of the original file are real content data, for metadata that is not clearly classified, such as the version number of the data file, it is treated as a special subject. 3. The data organizer inserts the data into the corresponding IO queue, and hands over to the thread pool for parallel IO operations. 4. The thread pool allocates available threads, writes topic data to the back-end file system, and the tag manager maintains a hash table for mapping topic types and physical paths.

The data acquisition means that ROS usually needs to replay the bag file or query a specific topic. The original rosbag tool needs to traverse the entire file to obtain the offset of the information in the file, and then construct an Index to facilitate querying. The time complexity of the entire step is O(N). It involves a lot of random reading, thus is very inefficient. The design of the storage management system of this embodiment significantly improves the performance of data acquisition. First of all, the storage management system eliminates the traversal operation required to open the bag file, but quickly parses the back-end directory tree and establishes a hash table in the tag manager. Then, the storage management system uses the topic name as a key to query the hash table to obtain the corresponding back-end path. Since the storage management system has divided the bag file into independent continuous files, the cache utilization has been significantly improved.

Figure 7:
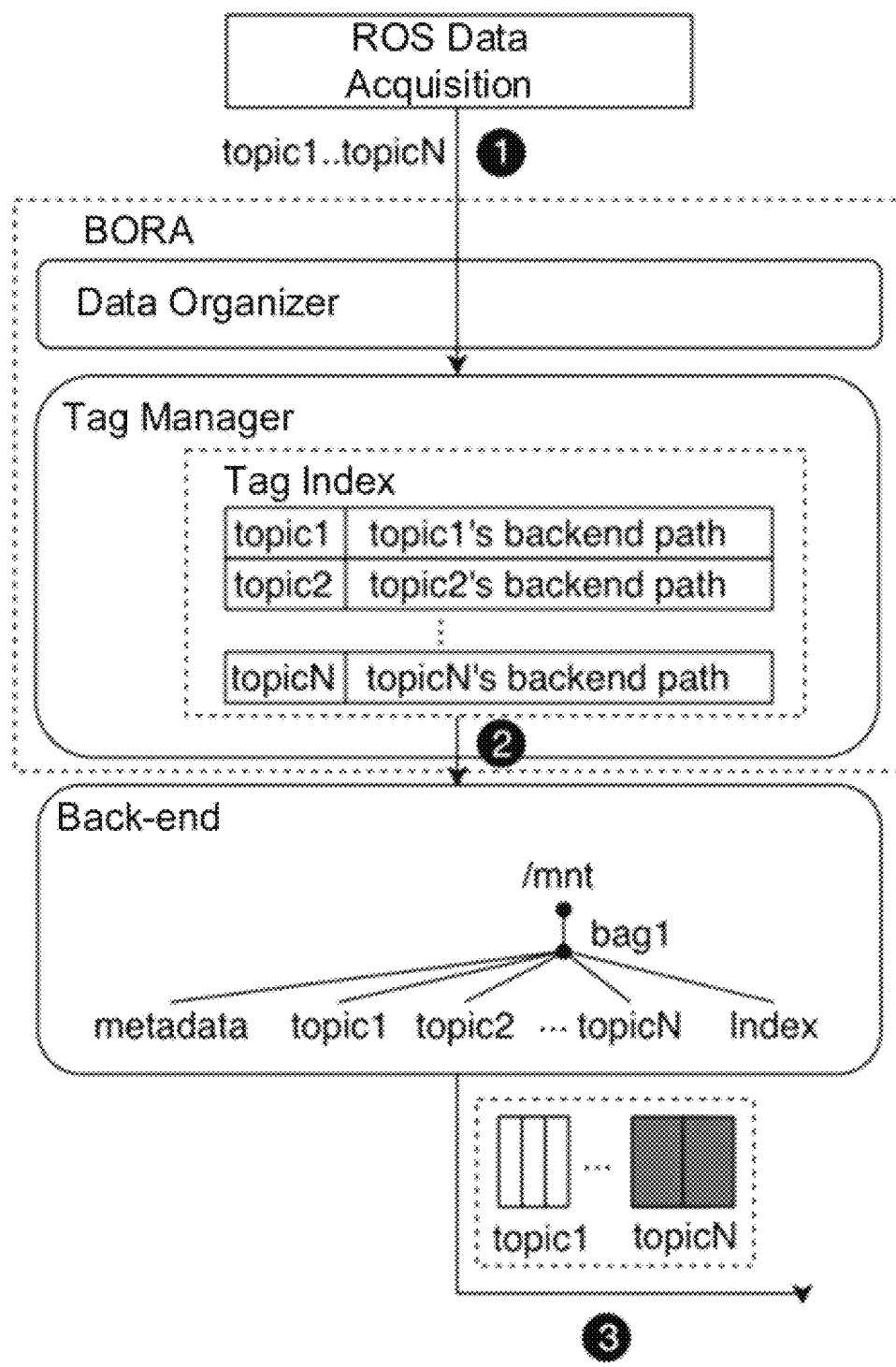
FIG. 7 shows a schematic diagram of the data acquisition process in an embodiment of this application.

The specific steps are shown in FIG. 7. 1. The storage management system captures the topic name query parameters initiated by ROS. 2. The tag manager searches according to the topic name (topic1, topic2, topicN) and returns the physical path (topic1's backend path, topic2's backend path, . . . , topicN's backend path) to the backend file system. 3. The backend file system returns the corresponding topic data to the ROS application.

The time querying of the data mainly means that data acquisition is a basic query method of ROS, and only topic names are used as query parameters. However, data analysis of robots usually requires multi-dimensional query, including topic name and timestamp. A timestamp usually points to a range, namely the start time and the stop time. The existing method first searches for all the information belonging to the specified topic, and then merge all the information belonging to the topic (merge sort) to generate an index entry list, each index entry contains timestamp and offset of the message, but the time complexity of this operation is Nlog(N), N is the number of messages.

Figure 8:
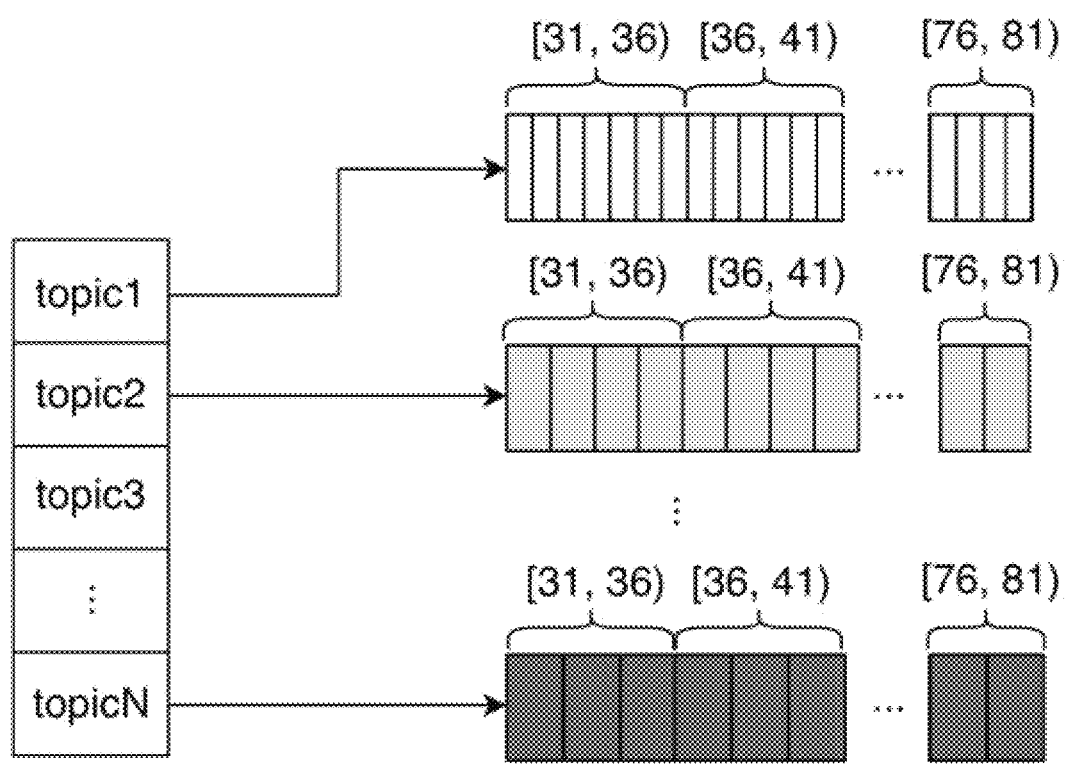
FIG. 8 shows a schematic diagram of a time retrieval process of data in an embodiment of this application.

The storage management system uses coarse-grained time index to improve performance. The storage management system will set a fixed time window for the bag file, and the data organizer will further subdivide the topic file according to the time window. Then, when the bag file is opened, a priority queue is maintained for each topic (topic) of the query according to the start time of the time window. So once the user provides the query range, such as start time and end time, the storage management system can find the corresponding index entry through simple calculation, such as [start time/time window, end time/time window]. The specific index structure is shown in FIG. 8. For example, topics whose starting time and ending time are [31,36), [36,41), and [76,81) are searched.

It can be seen that the storage management system for locally optimizing reading and writing of data provided in this embodiment has significant beneficial effects as follows: 1) The performance of ROS data access is significantly improved. The index mode of ROS query is optimized by reorganizing the data storage structure, which significantly reduces the time for the RSO to scan and index. At the same time, techniques such as coarse-grained time index are used to optimize the query performance of ROS. 2) the data access sequence of ROS is optimized. For the data reading and collection of related tags, the access mode of interleaved and random has been transformed into a sequential and block access mode, thus the working performance of the physical storage hardware, especially HDD, is improved, and the probability of failure is reduced. 3) the compatibility with ROS applications is ensured. The present disclosure only classifies and organizes data records, and is implemented in the form of a user-mode middle layer. On the one hand, it does not interfere with the work flow of the mature parallel or distributed storage system used by the bottom layer, and the back-end storage still has functions such as parallel reading and writing, consistency redundancy, and failure recovery, so as to ensure the correctness of the data. On the other hand, it does not break the data format requirements of the user program, and can still provide the user with the file with original format.

In summary, the data management system, method, terminal, and medium based on hybrid storage provided by this application use FUSE to mount a user-mode file system for managing users' POSIX data requests in the system; use the multi-backend function provided by PLFS to mount two parallel back-end file systems in a user-mode file system; the data label module will label the user's POSIX data request; the file system selection module will operate the data according to the data label. The application significantly saves energy, and ensures the reliability of the storage system without damaging the consistency of data. Therefore, this application effectively overcomes various shortcomings in the prior art and has a high industrial value.

The foregoing embodiments only exemplarily illustrate the principles and effects of the present application, and are not used to limit the present application.

Anyone familiar with this technology can modify or change the above-mentioned embodiments without departing from the spirit and scope of this application. Therefore, all equivalent modifications or changes made by those with ordinary knowledge in the technical field without departing from the spirit and technical ideas disclosed in this application should still be covered by the claims of this application.

What is claimed is:

1. A storage management system for locally optimizing reading and writing of data, comprising:
   a means for data container, to divide a bag file into multiple single topic files;
   a means for data organizer, to organize the data content when the original bag file is written, and distribute it to the back-end directory;
   a means for tag manager, to maintain a hash table for a mapping topic type and a physical path;
   a means for coarse-grained time index, to generate index entry and add to the index file,
   wherein an operation of the storage management system includes data replication, and the data replication includes:
   after capturing a request for writing a bag file to a back-end file system, the means for data container scans the bag file and divides the bag file into multiple single-topic files;
   the means for data organizer inserts the divided single-topic file data into the corresponding IO queue, and passes it to the thread pool for IO parallel operation; the thread pool allocates available threads to write each IO queue into the back-end file system;
   wherein any one of the means for data container, the means for data organizer, the means for tag manager, and the means for coarse-grained time index is one of an application specific integrated circuit, a digital signal processor, and a field programmable gate array; wherein the means for data container, the means for data organizer, the means for tag manager, and the means for coarse-grained time index are further integrated together in the form of a system-on-a-chip.

2. The storage management system according to claim 1, wherein an internal structure of the means for data container includes a hierarchical directory tree structure; the means for data container creates a front-end and a back-end; the front-end includes a logical view for viewing the complete bag file; the back-end saves the divided bag file in the hierarchical directory tree structure.

3. The storage management system according to claim 1, wherein the means for data organizer scans each piece of information, determines the type of the scanned information according to a storage format of a robot operating system, and writes the scanned information into the corresponding back-end file.

4. The storage management system according to claim 1, wherein an operation of the storage management system includes data acquisition, and the data acquisition includes:
  after capturing a request querying the topic name in the file system, the means for tag management searches based on a topic name and returns a corresponding physical path;
  the back-end file system returns the corresponding topic data to a robot operating system.

5. The storage management system according to claim 1, wherein an operation of the storage management system includes time retrieval of data, and the time retrieval of data includes:
  a fixed time window is set for the bag file, and the means for data organizer subdivides the single-topic file according to the time window for time retrieval of data according to the start time and the end time in the user request.

* * * * *